(12) United States Patent
Tondera et al.

(10) Patent No.: US 12,428,244 B2
(45) Date of Patent: Sep. 30, 2025

(54) PROCESSING DEVICE AND METHOD FOR PROCESSING A CONTAINER

(71) Applicant: TT Innovation AG, Zug (CH)

(72) Inventors: Marc Tondera, Riehen (CH); Tobias Jan Schneidler, Diepflingen (CH); Julia Annette Carli, Basel (CH); Mathieu Müller, Sierentz (FR); Philipp Leuenberger, Basel (CH); Christophe Rethoret, Issenheim (FR); Mike Zeller, Wahlen (CH)

(73) Assignee: TT Innovation AG, Zug (CH)

( * ) Notice: Subject to any disclaimer, the term of this patent is extended or adjusted under 35 U.S.C. 154(b) by 115 days.

(21) Appl. No.: 18/580,206

(22) PCT Filed: Jul. 25, 2022

(86) PCT No.: PCT/EP2022/070845
§ 371 (c)(1),
(2) Date: Jan. 18, 2024

(87) PCT Pub. No.: WO2023/006692
PCT Pub. Date: Feb. 2, 2023

(65) Prior Publication Data
US 2024/0327138 A1    Oct. 3, 2024

(30) Foreign Application Priority Data

Jul. 28, 2021   (EP) .................................... 21188181

(51) Int. Cl.
*B65G 54/02*    (2006.01)
*B65B 43/59*    (2006.01)

(52) U.S. Cl.
CPC .............. *B65G 54/02* (2013.01); *B65B 43/59* (2013.01); *B65G 2201/0235* (2013.01)

(58) Field of Classification Search
CPC ........... B65G 54/02; B65G 2201/0235; B65G 19/02; B65G 17/323; B65G 47/91; B65G 47/847; B65G 47/848; B65G 47/918; B65G 29/00; B65B 43/59; B65B 43/42; B65B 43/46; B65B 35/36; B65B 35/38; B65B 35/16; B65B 35/18; B25J 15/0052
See application file for complete search history.

(56) References Cited

U.S. PATENT DOCUMENTS 5,941,366 A * 8/1999 Quinlan ................. G01N 35/04
                                                        198/465.1
8,973,741 B2 * 3/2015 Cavina ................... B65G 21/22
                                                        198/731
(Continued)

FOREIGN PATENT DOCUMENTS

EP        2544974 B1       9/2014
EP        2927168 A1 * 10/2015 ............. G01N 35/04
(Continued)

*Primary Examiner* — Gene O Crawford
*Assistant Examiner* — Muhammad Awais
(74) *Attorney, Agent, or Firm* — Volpe Koenig

(57) ABSTRACT

In the processing device (1) according to the invention, a container holder (8) is arranged between a transport unit (3), which is magnetically coupled to a stator assembly (4) in order to be moved via a drive surface (5), and the container (2), and the container holder (8) can be selectively coupled to the support element (6) and the transport unit (3).

20 Claims, 6 Drawing Sheets

(56) References Cited

U.S. PATENT DOCUMENTS

| | | | | |
|---|---|---|---|---|
| 9,309,062 B2* | 4/2016 | Hecht | ............... | B65G 49/00 |
| 9,403,611 B2* | 8/2016 | Sacchetti | ............. | B65G 47/842 |
| 2014/0232045 A1* | 8/2014 | Winzinger | ................ | B65C 9/00 |
| | | | | 425/145 |
| 2014/0326082 A1* | 11/2014 | Hirama | ................... | G01N 1/00 |
| | | | | 73/863.92 |
| 2015/0177268 A1* | 6/2015 | Reisch | .................. | G01N 35/02 |
| | | | | 436/180 |
| 2017/0225814 A1* | 8/2017 | Eberhardt | ............ | B65B 7/2821 |

FOREIGN PATENT DOCUMENTS

| | | | | |
|---|---|---|---|---|
| EP | 3828106 A1 * | 6/2021 | ............ | B65B 59/04 |
| WO | 2016012160 A1 | 1/2016 | | |

* cited by examiner

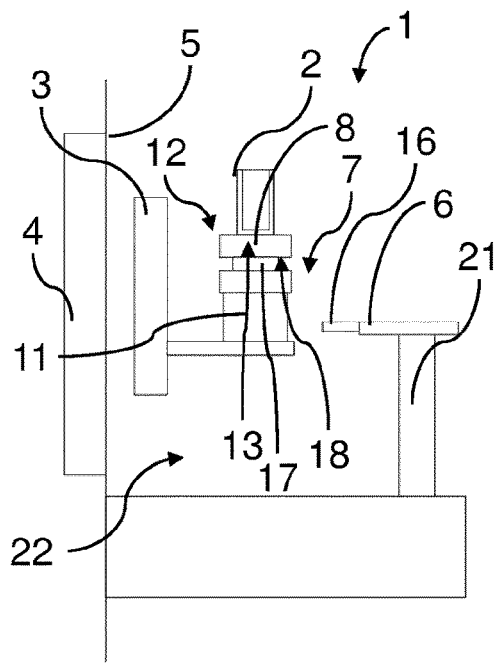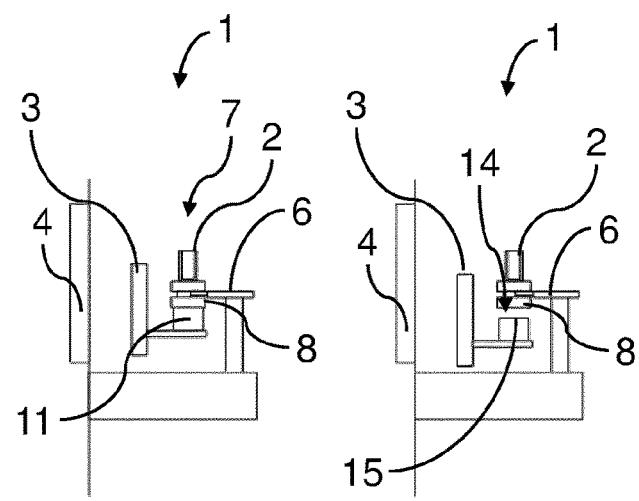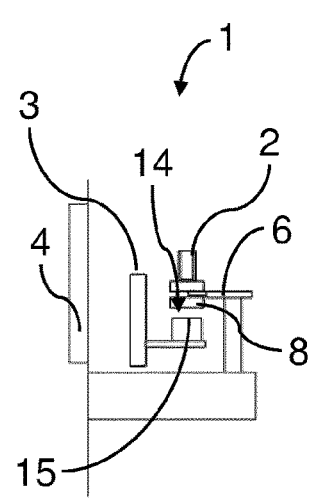
Fig. 7　　　　　Fig. 8　　　　　Fig. 9
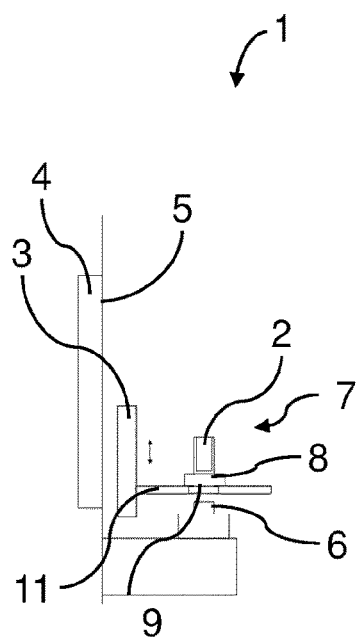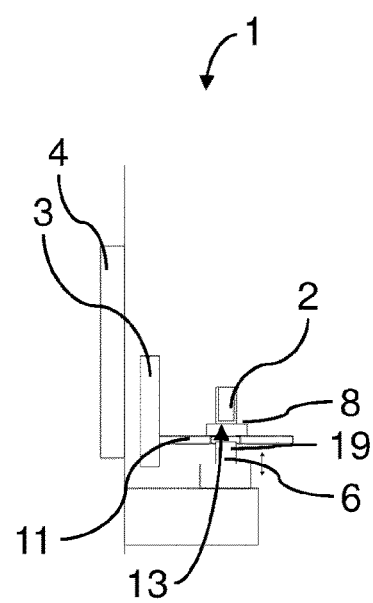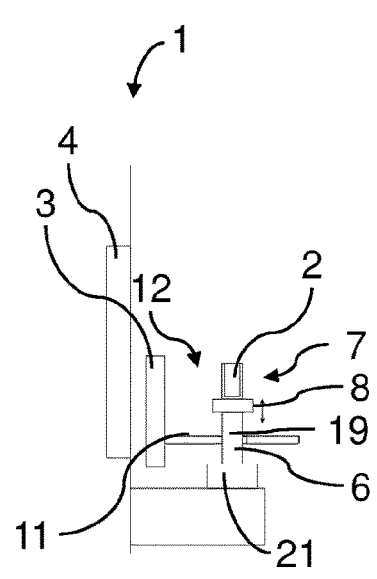
Fig. 10　　　　　Fig. 11　　　　　Fig. 12

PROCESSING DEVICE AND METHOD FOR PROCESSING A CONTAINER

CROSS-REFERENCE TO RELATED APPLICATIONS

This application is a 371 National Phase of International Application No. PCT/EP2022/070845, filed Jul. 22, 2022, which claims priority from European Patent Application No. 21188181.8, filed Jul. 28, 2021, both of which are incorporated herein by reference as if fully set forth.

TECHNICAL FIELD

The invention relates to a processing device for processing at least one container, having a transport unit which is magnetically coupled to a stator assembly and can be moved on a drive surface by energizing the stator assembly, wherein at least one support element defines a working space for processing the container, wherein the container can be coupled to the support element by a relative movement of the transport unit and support element.

The invention further relates to a method for processing at least one container, wherein the at least one container is moved to at least one support element by a transport unit which is magnetically coupled to a stator assembly and can be moved on a drive surface by energizing the stator assembly, wherein the at least one container is coupled to the at least one support element by a relative movement of the transport unit and the support element.

SUMMARY

The invention is based on the object of simplifying the manufacture of a processing device.

To solve the said object, it is thus proposed according to the invention in a processing device of the type described at the beginning that the transport unit has at least one container holder which carries the at least one container, that the at least one container holder can be decoupled from the transport unit and that the at least one support element engages on the at least one container holder for coupling. It is advantageous that a transport unit can be used which does not have to be adapted to the at least one container. This can help to simplify the manufacture of the transport unit if, for example, different containers are to be processed. In addition, the container holders can also be used to transfer non-self-standing containers to the support elements.

The drive surface can be oriented as desired, for example as a vertical drive surface or a horizontal drive surface or as an inclined drive surface, in particular as a ramp.

In an advantageous embodiment, it may be provided that the at least one container holder can be decoupled from the transport unit by the relative movement. This makes it possible to reduce or even completely eliminate any disruptive influence of the transport unit on a processing step that is to be carried out in the working space.

In an advantageous embodiment, it may be provided that the at least one support element can be moved to engage with the at least one container holder, in particular for the preferably indirect coupling of the at least one container. This means that sensitive coupling maneuvers can be performed independently of the accuracy of movement of the transport unit.

Here, for example, it may be provided that the at least one support element is arranged on a further transport unit. This means that the at least one support element can be moved together with a carrier.

Alternatively or additionally, it may be provided that the at least one support element is movably arranged on a carrier.

In an advantageous embodiment, it can alternatively be provided that the at least one support element is arranged in a fixed position. This means that additional drives on the support element are not required. A coupling movement can be carried out here, for example, by displacing and/or moving the transport unit.

In an advantageous embodiment, it may be provided that the transport unit forms a pass-through grip for the at least one support element to the container holder. This describes a simple means of combining secure attachment of the at least one container holder and reliable coupling. For example, the pass-through grip can be formed on a fork.

For example, it may be provided that the pass-through grip is formed on a base body of the transport unit that supports the at least one container holder. In this way, a central coupling to the container holder can be achieved. A risk of tilting during coupling can thus at least be reduced or even avoided.

In an advantageous embodiment, it may be provided that the at least one container holder is adapted to the shape of the at least one container on its side facing the at least one container. In this way, containers that have no or only an insufficient support surface, for example cartridges or cylindrical ampoules, can be accommodated without tilting and/or loss.

In an advantageous embodiment, it may be provided that the transport unit has a receiving geometry with which the at least one container holder can be accommodated. This allows the container holder to be securely attached to the transport unit.

Here, for example, it may be provided that the receiving geometry has a support on which the at least one container holder is placed. This means that additional fastening means for the container holder on the transport unit can be dispensed with or at least are not required in a redundant design.

In an advantageous embodiment, it may be provided that the at least one support element grips the outside of the at least one container holder.

Here, for example, it may be provided that the at least one support element has a fork for accommodating the at least one container holder.

In an advantageous embodiment, it may be provided that the processing device has a processing station with which the processing can be carried out. The advantage here is that complex processing steps can be carried out.

Here or in general, it may be provided that the process station comprises a filling station, a scale, a preferably optical inspection station, a separating station, a handling station, an inspection device, a washing station, a sample and/or reject removal station and/or a closing station, in particular for inserting a stopper. Individual or several, in particular all, steps of filling a container with the processing device can thus be carried out. The individual stations can, for example, be spaced apart or integrated.

In an advantageous embodiment, it may be provided that the support element forms a preferably movable part of a process station, in particular the aforementioned process station, in particular a scale, a filling station and/or a closing station. In this way, weighing, filling and/or closing can be carried out with a coupled container holder. In the case of a scale, for example, the movable part can be provided for determining the weight. In a filling station, for example, the movable part can be adapted to execute a relative movement of a filling needle relative to a filling level in the at least one container. In a closing station, for example, the movable part can be adapted to execute a stopper movement.

In an advantageous embodiment, it may be provided that the at least one support element is arranged on a carrier that provides a parking space for the transport unit during the uncoupling of the at least one container. This makes it possible to eliminate or at least reduce any disruption to processing caused by the presence of the transport unit.

In an advantageous embodiment, it may be provided that the container is detachably connected to the at least one container holder. This means that a container can be removed from the container holder, for example after completion of the method according to the invention. The container holder is thus reusable.

In an advantageous embodiment, it may be provided that the at least one container holder is detachably connected to a base body of the transport unit. This makes it easy to replace the container holder, for example after processing is complete and before processing differently shaped containers.

The base body can be designed to be interchangeable, for example. This makes it easy to adapt the transport unit to different container holders, in particular to container holders and/or containers of different thicknesses and/or lengths. For example, thick containers can be carried in suitable container holders with large, suitable base bodies and thin containers can be carried in suitable container holders with small, suitable base bodies. For example, long and short containers and/or container holders with different base bodies can thus also be carried, with one opening of the container being arranged at the same height.

In an advantageous embodiment, it may be provided that the at least one support element is attached to or adjacent to the drive surface. This makes it easy to move the transport units up to the support element.

The support element can be formed on a carrier, for example. This provides a stable abutment.

In an advantageous embodiment, it may be provided that the at least one support element is aligned in such a way that a coupling movement of the coupling with the at least one container takes place along the drive surface. This means that a displacing movement of the transport unit can be used for coupling.

In an advantageous embodiment, it can alternatively or additionally be provided that the at least one support element is aligned in such a way that a coupling movement of the coupling with the at least one container takes place transversely to the drive surface. Thus, for example, a lifting and/or tilting movement of the transport unit can be used for coupling.

In an advantageous embodiment, it may be provided that the at least one container holder is designed to hold more than one container at the same time. This means that a plurality of containers can be processed simultaneously and/or in parallel.

In an advantageous embodiment, it may be provided that the at least one container holder is designed to support a matched container with a non-flat base. This means that containers with any shaped outer contour can be processed.

In an advantageous embodiment, it may be provided that the at least one container holder is designed in two parts. This makes it easy to provide complex and/or different contours.

It may be provided that a container part, which can be connected to the at least one container, can be separated from a support part, which can be coupled to the at least one support element and/or the transport unit. In this way, differently shaped container holders can be easily formed on the container side.

In an advantageous embodiment, it may be provided that the at least one container holder is held in position by positive and/or non-positive connection when coupled to the transport device. This makes coupling simple and safe.

For example, the non-positive connection can be generated by magnetic forces. This prevents unintentional release.

In an advantageous embodiment, it may be provided that the at least one container holder is held in position by positive and/or non-positive connection when coupled to the support element. This enables safe handling of the container holders on the support element.

For example, the non-positive connection can be generated by magnetic forces. This prevents unintentional release.

In an advantageous embodiment, it may be provided that the at least one container holder has a receiving shape for coupling with the at least one support element. This allows the container holder to be gripped by the support element.

For example, the receptacle shape can have at least one shoulder and/or at least one recess. This enables simple force transmission to the container holder. The recess can be designed as a groove or notch, for example.

The support element can alternatively or additionally have a fork that engages with the receptacle shape. This makes it easy to grip the container holder from the outside.

For example, it may be provided that the fork acts or engages on the aforementioned at least one stop and/or in the aforementioned at least one recess. This makes it easy to achieve a positive connection.

In an advantageous embodiment, it may be provided that more than one container holder is present. It is advantageous that the container holders can be designed to be detachable from the transport unit independently of one another.

Here, for example, it may be provided that the container holders can be coupled at least partially separately from one another and/or together with the at least one support element. Groups can thus be formed, each comprising at least one container holder, which can be brought into contact with the at least one support element together—as a group—but separately from the other groups. An individual support element can be assigned to each group. This means, for example, that different types of containers can be arranged in groups and processed in parallel or simultaneously.

Alternatively or additionally, it may be provided, for example, that the container holders can be at least partially decoupled separately from one another and/or together from the transport unit. Groups can thus be formed, each comprising at least one container holder, which can be separated from the transport unit together—as a group—but separately from the other groups. This means that the container holders can be exchanged individually or in groups, for example for simple adaptation to different containers.

In an advantageous embodiment, it may be provided that container holders or container parts thereof are kept ready in a supply, which can be optionally exchanged on the transport unit depending on the container to be transported. In this way, container holders and/or container parts can be replaced easily, in particular without manual intervention. Here, for example, it may be provided that the supply can be approached by the transport units.

Alternatively or additionally, the features of the alternative independent claim directed to methods are provided according to the invention for solving the said object. In particular, it is thus proposed in accordance with the invention for solving the said object in a method of the type described at the beginning that at least one container holder of the transport unit carries the at least one container, that the at least one container holder can be decoupled from the transport unit, that the at least one support element engages on the at least one container holder for coupling and that the processing of the at least one container is carried out when the at least one support element engages on the at least one container holder. Thus, a flexibly configurable method can be provided with which different containers can be processed. It can thus be achieved that the processing of the at least one container is carried out when the at least one container is coupled to the at least one support element.

It is particularly advantageous if the method according to the invention is carried out with a processing device according to the invention, in particular as described above or below and/or according to one of the claims directed to a processing device.

BRIEF DESCRIPTION OF THE DRAWINGS

The invention will now be described in more detail with reference to exemplary embodiments, but is not limited to these exemplary embodiments. Further exemplary embodiments result from combining the features of individual or several claims with one another and/or with individual or several features of the exemplary embodiment.

The drawings show in the following a highly simplified representation of the principle:

FIG. 7 shows a side view of a further processing device according to the invention, in which the container holders are coupled to the transport unit, FIG. 8 shows the processing device from FIG. 7 in a reduced view, wherein the container holders are coupled to a support element, FIG. 9 shows the processing device from FIG. 8, wherein the container holders are uncoupled from the transport unit, FIG. 10 shows a side view of a further processing device according to the invention, in which the container holders are coupled to the transport unit, FIG. 11 shows the processing device from FIG. 10, wherein the container holders are coupled to a support element, FIG. 12 shows the processing device from FIG. 11, wherein the container holders are uncoupled from the transport unit.

DETAILED DESCRIPTION

Figure 1:
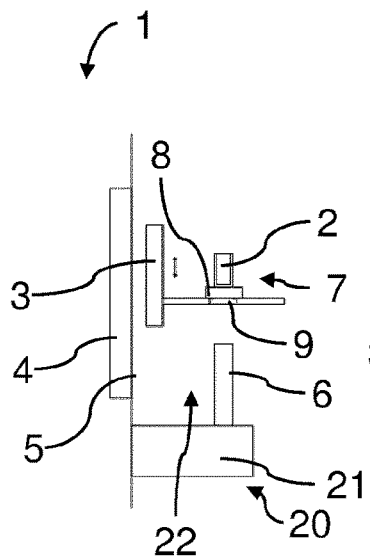
FIG. 1 shows a side view of a processing device according to the invention, in which the container holders are coupled to the transport unit.

FIGS. 1 to 6 show a first exemplary embodiment of a processing device according to the invention, designated in its entirety as 1, for processing at least one container 2 and are described together below.

The processing device 1 has at least one transport unit 3, which is magnetically coupled to a stator assembly 4. In a manner known per se, the stator assembly 4 has several coils which can be energized. By applying a suitable current to the stator assembly 4, the transport unit 3 can be moved on a drive surface 5, moved away from it or moved closer to it, rotated about an axis that is perpendicular to the drive surface 5 or tilted about an axis that is parallel to the drive surface 5.

The stator assembly 4 can be coupled simultaneously to several transport units 3, which can be moved independently of each other by means of a corresponding local control or specification of a current.

The processing device 1 also has at least one support element 6, which—in the example above it—defines a working space 7 for processing the container 2.

Such processing can be, for example, filling and/or weighing and/or preferably visual inspection and/or closing of the container 2 and/or other preferably automated processing and/or handling and/or transfer to or from a third-party system.

The container 2 can be coupled to the support element 6 (indirectly, via a container holder 8 described in more detail) by a relative movement of the transport unit 3 and the support element 6. In the exemplary embodiment, this takes place in the movement between FIGS. 1 and 4 on the one hand and FIGS. 2 and 5 on the other. The coupling is produced here, for example, by touching the support element 6 or placing it on the support element 6. For this purpose, the at least one support element 6 is aligned in such a way that a coupling movement of the (indirect) coupling with the at least one container 2 along the drive surface 5 is effected by the traversing movement 23.

Figure 4:
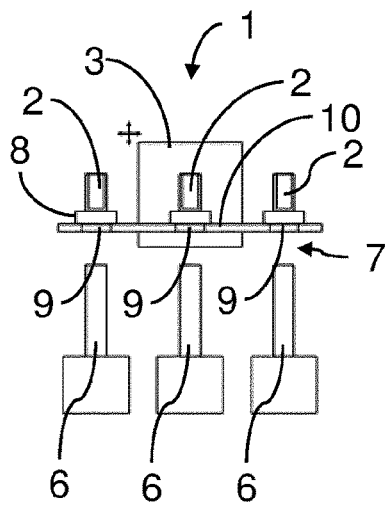
FIG. 4 shows the processing device from FIG. 1 in a front view of the drive surface.
Figure 5:
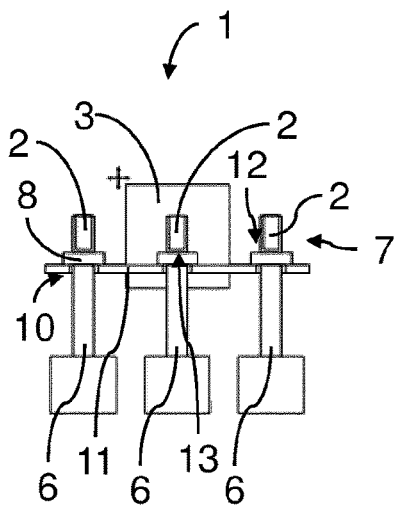
FIG. 5 shows the processing device from FIG. 2 in a front view of the drive surface.
Figure 6:
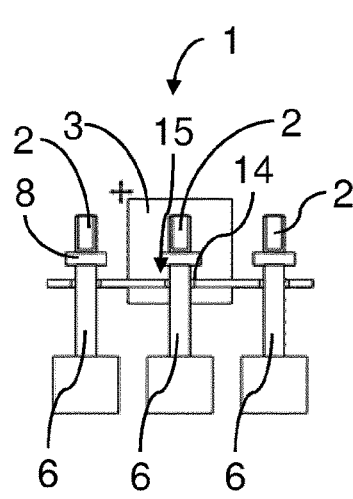
FIG. 6 shows the processing device from FIG. 3 in a front view of the drive surface.

FIGS. 4 to 6 show the case of a processing device 1 with three support elements 6, which together define a working space 7.

In other exemplary embodiments, other numbers of support elements 6 and/or containers 2 are present.

The transport unit 3 carries at least one container holder 8. The at least one container 2 is in contact with the container holder 8. The container holders 8 can be removed from the transport unit 3 independently of one another and coupled to the associated support element 6.

This at least one container holder 8 can be decoupled or detached from the transport unit 3.

Figure 2:
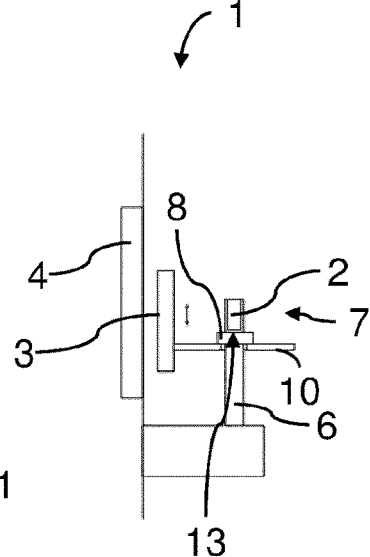
FIG. 2 shows the processing device from FIG. 1, wherein the container holders are coupled to a support element.

In order to couple the container 2 (indirectly) to the support element 6, the at least one support element 6 engages with the container holder 8 (FIGS. 2 and 5).

Figure 3:
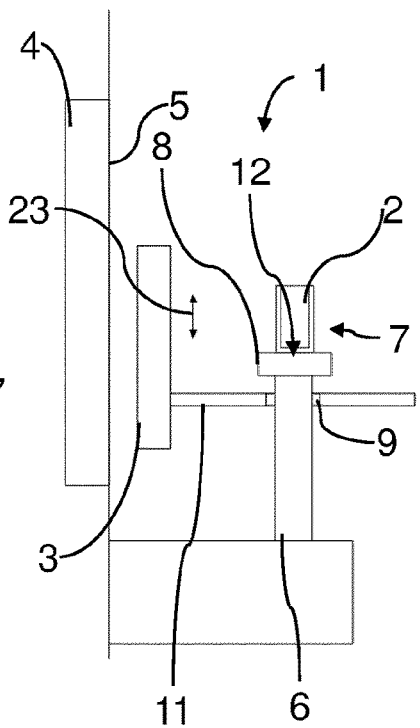
FIG. 3 shows an enlarged view of the processing device from FIG. 2, with the container holders uncoupled from the transport unit.

If the transport unit 3 is moved further along the drive surface relative to the support element 6, the container holder 2 is decoupled from the transport unit 3 (FIGS. 3 and 6).

The at least one container holder 8 is thus detachably connected to the base body 11 of the transport unit 3 and can be easily replaced.

The transport unit 1 forms a pass-through grip 9 on a fork 10. The at least one support element 6 engages with the container holder 2 through the pass-through grip 9 and lifts it out.

The fork 10 (or in further exemplary embodiments, for example, a perforated plate) is attached or formed on a base body 11 of the transport unit 3.

On one side 12 of the container holder 8, which faces the container 2, the container holder 8 is adapted to the outer contour of a lower area of the container 2. This means that containers 2 with a very small installation area or no installation area 13 can also be held securely.

The transport unit 3 has a receiving geometry 14 on its base body 10, which is adapted to an outer contour of the container holder 8.

In the exemplary embodiment shown, the receiving geometry 14 forms a support 15 on which the container holder 8 can be placed.

The at least one support element 6 is pin-shaped in the exemplary embodiment shown.

In further exemplary embodiments, the process station 20 is designed as a filling station or closing station or optical control station, for example.

FIGS. 7 to 9 show a further exemplary embodiment according to the invention. Components and functional units that are functionally and/or structurally similar or identical to the preceding exemplary embodiments are designated with the same reference signs and are not described separately again. The explanations relating to FIGS. 1 to 6 therefore apply accordingly to FIGS. 7 to 9.

FIG. 7 shows the situation in which the container holder 8 is coupled to the container 2 and the transport unit 3. FIG. 8 shows the coupling of the container holder 8 to a fork-shaped support element 6. Finally, FIG. 9 shows the situation in which the container holder 8 is uncoupled or separated from the transport unit 3.

The exemplary embodiment according to FIGS. 7 to 9 differs from the preceding exemplary embodiment at least in that a coupling movement to produce a coupling between the support element 6 and the container holder 8 takes place at least partially perpendicular to the drive surface 5, for example by means of a stroke.

The container holder 8 is decoupled from the transport unit 3 by a movement 23 along the drive surface (vertical in this case).

The exemplary embodiment according to FIGS. 7 to 9 differs further from the preceding exemplary embodiment in that the support element 6 is designed as a fork 16, which grips the container holder 8 on both sides.

The fork 16 engages in a recess 17.

The recess 17 surrounds the container holder 8 in a ring shape.

The support element 6 rests in the recess 17 on a shoulder 18 on the container holder 8.

The support element 6 is fixed to a carrier 21.

The carrier 21 is shaped in such a way that a parking space 22 is created for the transport unit 3 during the processing of the at least one container 2 in the working space 7.

The exemplary embodiment according to FIGS. 7 to 9 differs further from the preceding exemplary embodiment in that the at least one support element 6 is fastened adjacent to the drive surface 5.

Here, the at least one support element 6 is aligned in such a way that a coupling movement of the coupling with the at least one container 2 (via the container holder 8) takes place transversely to the drive surface 5 (transition from FIG. 7 to FIG. 8). The transport unit 3 performs a lifting movement that is oriented horizontally due to the vertical positioning of the drive surface 5.

FIGS. 10 to 12 show a further exemplary embodiment according to the invention. Components and functional units that are functionally and/or structurally similar or identical to the preceding exemplary embodiments are designated with the same reference signs and are not described separately again. The explanations relating to FIGS. 1 to 9 therefore apply accordingly to FIGS. 10 to 12.

The exemplary embodiment according to FIGS. 10 to 12 differs from the preceding exemplary embodiments at least in that the at least one support element 6 is movable in order to generate the relative movement between the transport unit 3 and the at least one support element 6. The support element 6 is supported on a carrier 21.

Accordingly, FIG. 10 shows a fully retracted support element 6, FIG. 11 shows a support element 6 that is extended until it contacts the container holder 8, while FIG. 12 shows a container holder 8 that is decoupled from the transport unit 3.

The support element 6 is a movable part 19 of a process station 20.

In further exemplary embodiments, the support element 6 is designed as a movable part 19 of a scale, wherein a position of the movable part is used in a manner known per se to determine the weight of the container 2 (tare, net and/or gross).

In further exemplary embodiments, the support element 6 is designed as a movable part of a filling station, wherein a filling needle known per se is arranged on the movable part. The mobility can be used here, for example, to insert the filling needle into the container 2. However, this can also be done by moving the transport unit 3. The mobility can therefore be used alternatively or additionally, for example, to guide the filling needle in order to prevent it from dipping below the current filling level and/or to maintain a maximum distance from the filling level.

Figure 13:
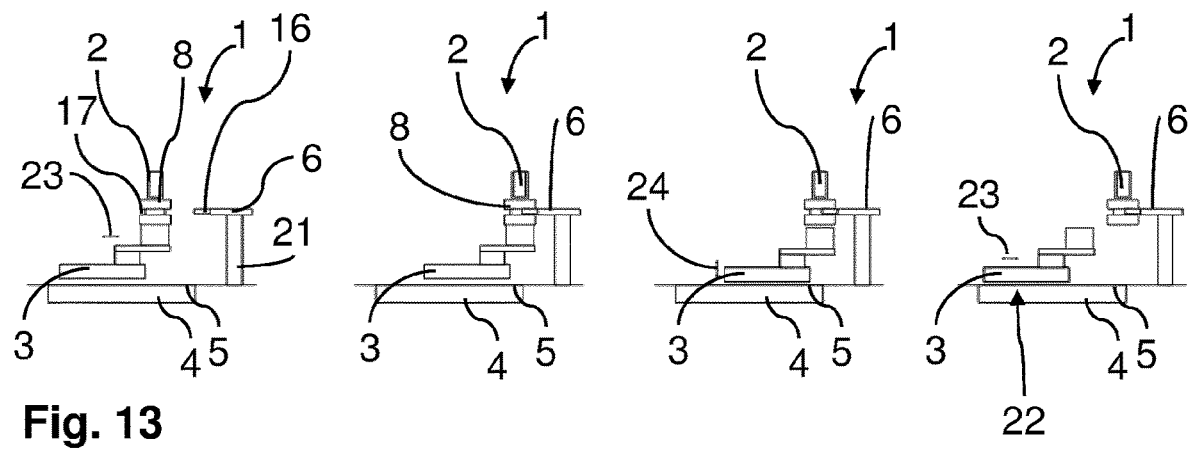
FIG. 13 shows a motion sequence of coupling and uncoupling in a further processing device according to the invention.

FIG. 13 shows a further exemplary embodiment according to the invention. Components and functional units that are functionally and/or structurally similar or identical to the preceding exemplary embodiments are designated with the same reference signs and are not described separately again. The explanations relating to FIGS. 1 to 12 therefore apply accordingly to FIG. 13.

The exemplary embodiment according to FIG. 13 differs from the preceding exemplary embodiments in that the drive surface 5 is aligned horizontally.

The following movement sequence is shown from left to right.

First, the transport unit 3 is moved to the process station 20 in a traversing movement 23 until the at least one container holder 8 is arranged in the fork 16 of the support element 6 (2nd image from left).

A lifting movement 24 is then executed in order to lower the container holder(s) 8. This leads to a coupling of the container holder(s) 8 with the support element 6 and a decoupling of the container holder(s) 8 from the transport unit 3 (3rd image from left).

The transport unit 3 is then moved to a parking position 22 (right-hand image) and the processing of the at least one container 2 can be carried out.

Figure 14:
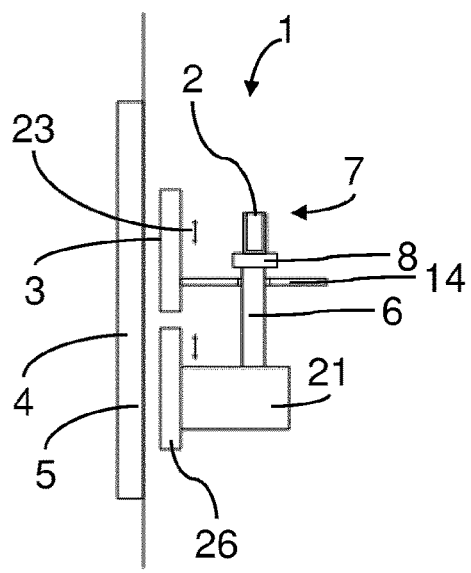
FIG. 14 shows another processing device according to the invention.
Figure 15:
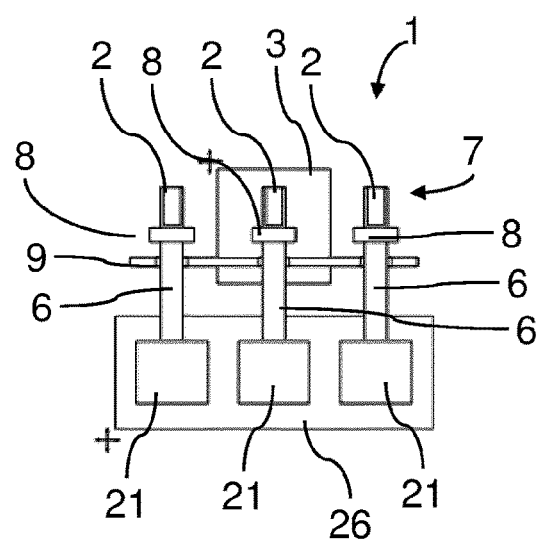
FIG. 15 shows the processing device from FIG. 14 in a front view of the drive surface.

FIGS. 14 and 15 show a further exemplary embodiment according to the invention. Components and functional units which are functionally and/or structurally similar or identical to the preceding embodiments are designated with the same reference signs and are not described separately again. The explanations relating to FIGS. 1 to 13 therefore apply accordingly to FIGS. 14 and 15.

The exemplary embodiment according to FIGS. 14 and 15 differs from the preceding exemplary embodiments at least in that the support element 6 is arranged on its own transport unit 26. The transport unit 26 is coupled to the stator assembly 4 in the same way as the at least one transport unit 3 and can be moved on the drive surface 5 independently of the transport unit 3.

In the exemplary embodiment, the movement sequence of coupling to the support element 6 and uncoupling from the transport unit 3 can therefore be achieved either by moving the transport unit 3 or by moving the further transport unit 26 in the opposite direction or by moving both transport units 3, 26 towards each other.

FIG. 15 shows that all support elements 6 are arranged on a further common transport unit 26. The support elements 26 can therefore be moved together.

Figure 16:
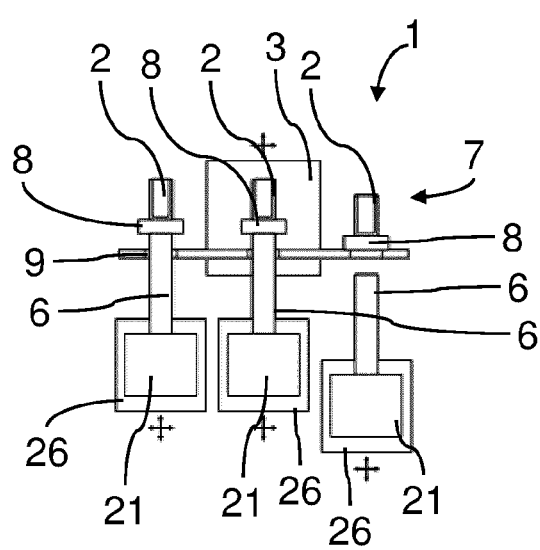
FIG. 16 shows a variant of FIG. 15.

FIG. 16 shows a further exemplary embodiment according to the invention. Components and functional units that are functionally and/or structurally similar or identical to the preceding embodiments are designated with the same reference signs and are not described separately again. The explanations relating to FIGS. 1 to 15 therefore apply accordingly to FIG. 16.

The exemplary embodiment according to FIG. 16 differs from the preceding exemplary embodiments in that the support elements 6 are arranged on individual transport units 26 and can therefore be moved independently of one another.

Figure 17:
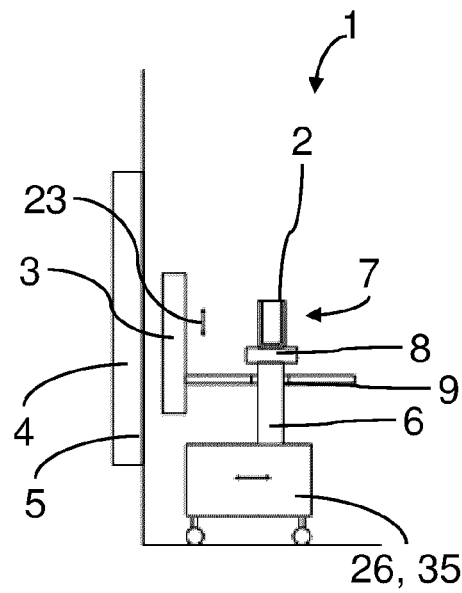
FIG. 17 shows another processing device according to the invention.

FIG. 17 shows a further exemplary embodiment according to the invention. Components and functional units that are functionally and/or structurally similar or identical to the preceding embodiments are designated with the same reference signs and are not described separately again. The explanations relating to FIGS. 1 to 16 therefore apply accordingly to FIG. 17.

The exemplary embodiment according to FIG. 17 differs from the preceding exemplary embodiments in that the at least one support element 6 is arranged on a carriage 35 (as an example of a further, non-inductively movable transport unit 26). If the carriage 35 has a drive, it can be used at least partially to generate a relative movement of the container 2 and the support element 6.

Figure 18:
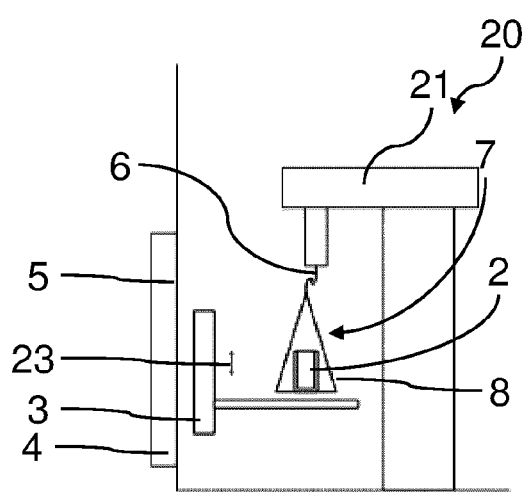
FIG. 18 shows another processing device according to the invention.

FIG. 18 shows a further exemplary embodiment according to the invention. Components and functional units that are functionally and/or structurally similar or identical to the preceding embodiments are designated with the same reference signs and are not described separately again. The explanations relating to FIGS. 1 to 16 therefore apply accordingly to FIG. 17.

The exemplary embodiment according to FIG. 18 differs from the preceding exemplary embodiments in that the container holder 8 is designed for a suspended arrangement on the hook-shaped support element 6.

The process station 20 can be a scale, for example.

Figure 19:
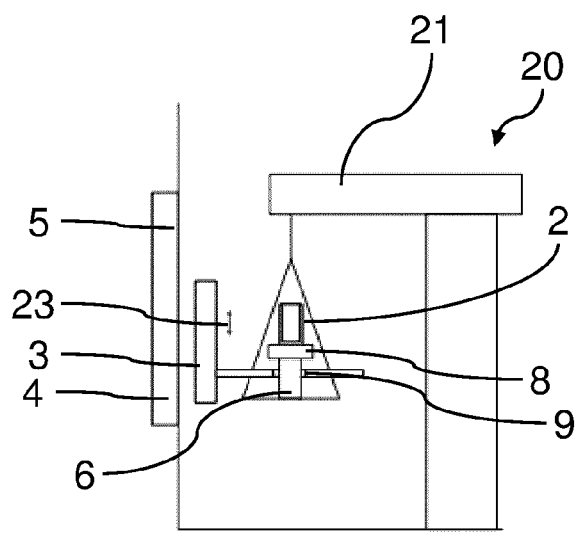
FIG. 19 shows a variant of FIG. 18.

FIG. 19 shows a further exemplary embodiment according to the invention. Components and functional units that are functionally and/or structurally similar or identical to the preceding embodiments are designated with the same reference signs and are not described separately again. The explanations relating to FIGS. 1 to 18 therefore apply accordingly to FIG. 19.

The exemplary embodiment according to FIG. 19 differs from the preceding exemplary embodiments in that a pin-shaped support element 6 is formed in a suspended arrangement on a carrier 21.

Figure 20:
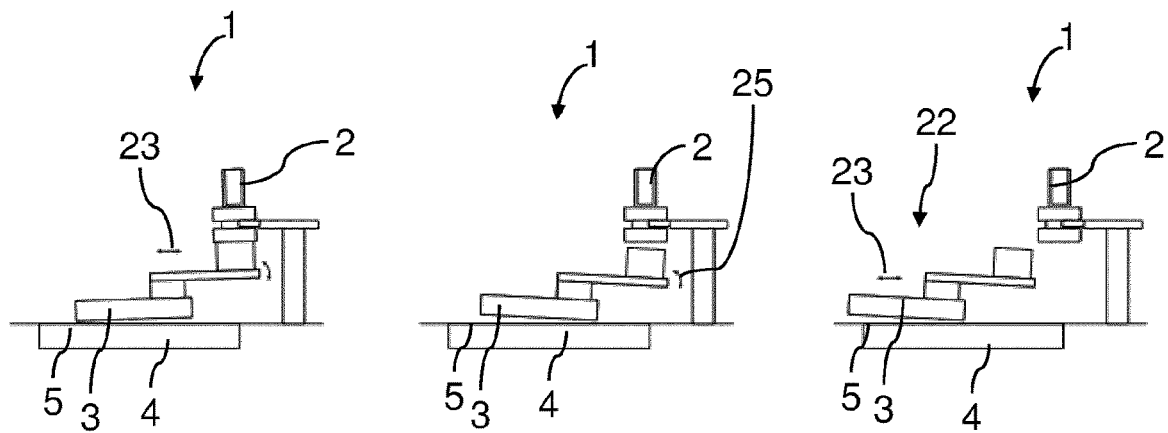
FIG. 20 shows a motion sequence of coupling and uncoupling in a further processing device according to the invention.

FIG. 20 shows a further exemplary embodiment according to the invention. Components and functional units that are functionally and/or structurally similar or identical to the preceding embodiments are designated with the same reference signs and are not described separately again. The explanations relating to FIGS. 1 to 19 therefore apply accordingly to FIG. 20.

In the exemplary embodiment shown in FIG. 20, the container holder 8 is first moved towards the support element 6 in a traversing movement 23, which is combined with a tilting movement 25 (left-hand image).

The container holder 8 is then lowered by a counter-rotating tilting movement 25 (middle image) and moved into a parking space 22 (right image).

Figure 21:
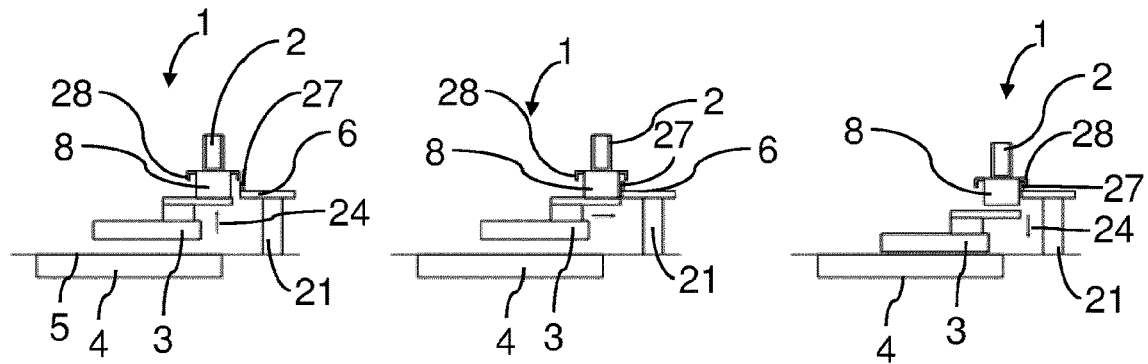
FIG. 21 shows a motion sequence of coupling and uncoupling in a further processing device according to the invention.
Figure 22:
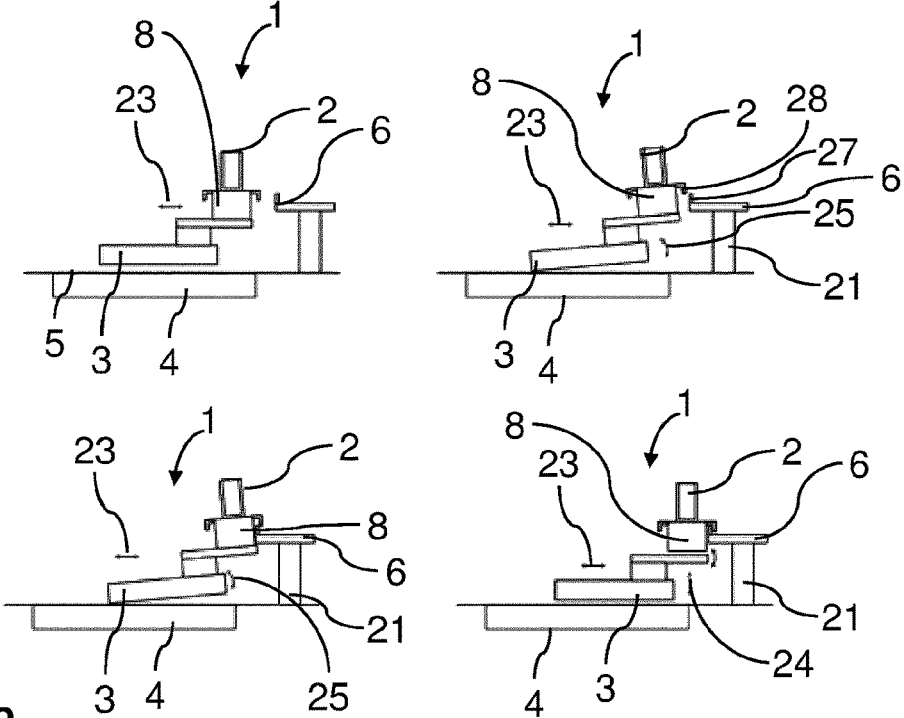
FIG. 22 shows a variant of the movement sequence shown in FIG. 21.

FIGS. 21 and 22 show a further exemplary embodiment according to the invention. Components and functional units which are functionally and/or structurally similar or identical to the preceding embodiments are designated by the same reference signs and are not described again separately. The explanations relating to FIGS. 1 to 20 therefore apply accordingly to FIGS. 21 and 22.

The exemplary embodiment according to FIGS. 21 and 22 differs from the preceding exemplary embodiments in that a retaining pin 27 is formed on the support element 6, which engages in a circumferential brim 28 on the container holder 8 and supports the latter.

For this purpose, the transport unit 3 as shown in FIG. 21 can hook the at least one container holder 8 onto the support element 6 with a lifting movement 24 (left-hand image), followed by a traversing movement 23 (middle image) and a final counter-rotating lifting movement 24 (right-hand image).

FIG. 22 shows an alternative movement sequence with a traversing movement 23 (top left), a combined traversing movement 23 and tilting movement 25 (top right), a combined counter-rotating traversing movement 23 with a counter-rotating tilting movement (bottom left) and a combined traversing movement 23 and (lowering) lifting movement 24 (bottom right).

Figure 23:
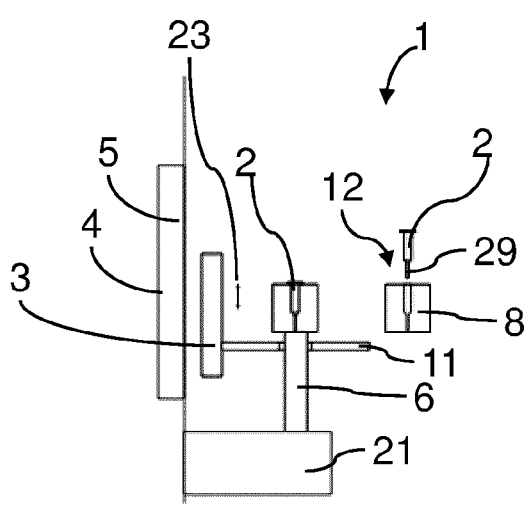
FIG. 23 shows a use of containers with an uneven base.

FIG. 23 shows a further exemplary embodiment according to the invention. Components and functional units that are functionally and/or structurally similar or identical to the preceding embodiments are designated with the same reference signs and are not described separately again. The explanations relating to FIGS. 1 to 22 therefore apply accordingly to FIG. 23.

The exemplary embodiment according to FIG. 23 differs from the preceding exemplary embodiments at least in that the container 2 does not have a support surface, but rather an uneven base 29 and therefore cannot stand upright by itself. The container holder 8 is provided here with an inner contour on its side 12 facing the container 2, which is matched to a contour of the container 2.

Figure 24:
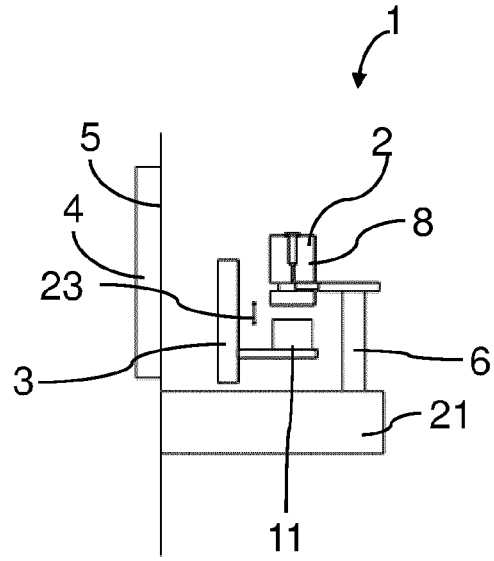
FIG. 24 shows a variant of FIG. 20.

FIG. 24 shows a further exemplary embodiment according to the invention. Components and functional units that are functionally and/or structurally similar or identical to the preceding embodiments are designated with the same reference signs and are not described separately again. The explanations relating to FIGS. 1 to 23 therefore apply accordingly to FIG. 24.

The exemplary embodiment according to FIG. 24 differs from the preceding exemplary embodiments at least in that the coupling of the container holder 8 to the support element 6 takes place with a lifting movement which—since the drive surface is vertically aligned—is horizontally oriented.

The base body 11 can be exchanged for another base body 11 in this exemplary embodiment, but also in other exemplary embodiments. This makes it easy to adapt to differently dimensioned containers 2 with associated container holders 8.

Figure 25:
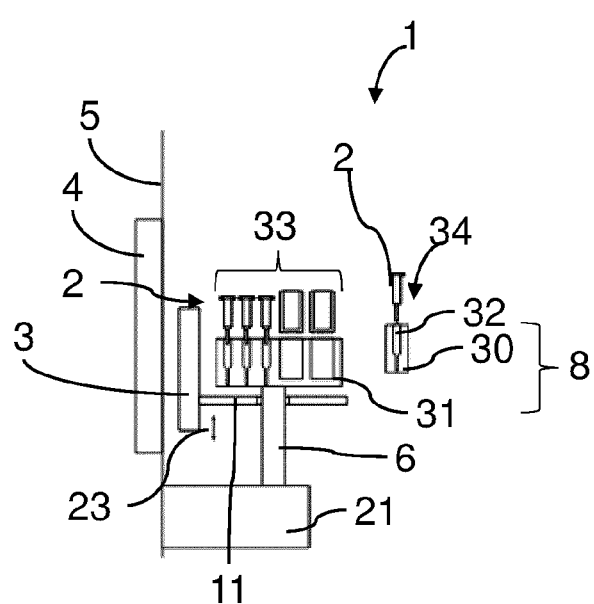
FIG. 25 shows simultaneous processing of different containers.

FIG. 25 shows a further exemplary embodiment according to the invention. Components and functional units that are functionally and/or structurally similar or identical to the preceding embodiments are designated with the same reference signs and are not described separately again. The explanations relating to FIGS. 1 to 24 therefore apply accordingly to FIG. 25.

FIG. 25 shows a container holder 8 for holding several different containers 2 at the same time.

FIG. 25 also shows, as representative of all other embodiments, that each container 2 can be removed from the container holder 8.

The container holder 8 can here not only accommodate a plurality of containers 2 as a group 33, but independently thereof has a container part 30 (thus for example a part of the container holder 8 facing and/or contacting the container 2) and a support part 31 (thus for example a part of the container holder 8 facing and/or contacting the support element 16), which can be put together to form the container holder 8.

It is provided here that the container part 30, which can be connected to the at least one container 2, can be separated from the support part 31, which can be coupled to the at least one support element 6 and/or the transport unit 3.

The container part 30 has a special mounting shape 32 that is adapted to the container 2.

Different container holders 8 or at least different container parts 30 are kept ready for exchange in a supply 34, which can preferably be approached by the transport units 3.

Figure 26:
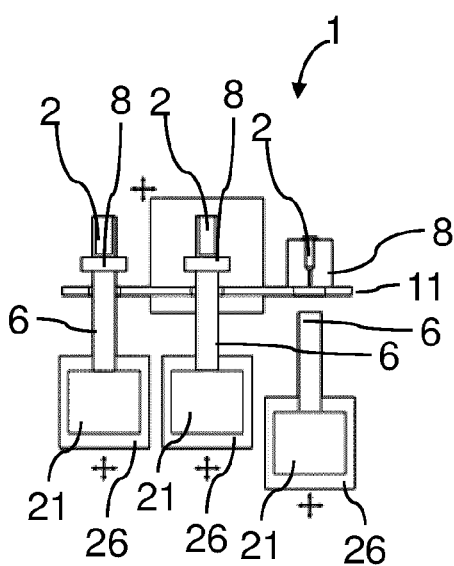
FIG. 26 shows a variant of FIG. 25.

Finally, FIG. 26 shows an example of the use of several individually movable support elements 6 in conjunction with different containers 2 and container holders 8.

In the exemplary embodiments, it can be seen that the container holder 8 is held positively on the transport unit 3. This can be reinforced by magnetic forces.

The containers 2 are held positively on the container holder 8. This can also be reinforced by magnetic forces.

The processing device 1 can thus be used to implement a method for processing at least one container 2, wherein the at least one container 2 is moved to at least one support element 6 by a transport unit 3, which is magnetically coupled to a stator assembly 4 and can be moved on a drive surface 5 by energizing the stator assembly 4, wherein the at least one container 2—via the container holder 2—is coupled to the at least one support element 6 by a relative movement of transport unit 3 and support element 6.

At least one container holder 8 of the transport unit 3 will carry the at least one container 2.

The at least one container holder 8 can be decoupled from the transport unit 3.

The at least one support element 6 engages with the at least one container holder 8 for coupling.

The processing of the at least one container 2 is then carried out when the at least one container 2 is coupled to the at least one support element 6.

In the processing device 1 according to the invention, it is thus proposed to arrange a container holder 8 between a transport unit 3, which is magnetically coupled to a stator assembly 4 in order to be moved via a drive surface 5, and the container 2, which can be selectively coupled to the support element 6 and the transport unit 3.

LIST OF REFERENCE SIGNS

1 Processing device
2 Container
3 Transport unit
4 Stator assembly
5 Drive surface
6 Support element
7 Working space
8 Container holder
9 Pass-through grip
10 Fork of 3
11 Base body of 3
12 Side of 8
13 Installation area
14 Receiving geometry of 3
15 Support of 14
16 Fork of 6
17 Recess of 8
18 Shoulder of 17
19 Moving part of 20
20 Processing station
21 Carrier
22 Parking space for 3
23 Traversing movement
24 Lifting movement
25 Tilting movement
26 (Further) transport unit
27 Retaining pin
28 (Circumferential) brim
29 (Uneven) base
30 Container part
31 Support part
32 Mounting shape
33 Group
34 Supply
35 Carriage

The invention claimed is:

1. A processing device (1) for processing at least one container (2), the processing device comprising:
   a transport unit (3) which is magnetically coupled to a stator assembly (4) and is movable on a drive surface (5) by energizing the stator assembly (4);
   at least one support element (6) that defines a working space (7) for processing the container (2), and the container (2) is couplable to the support element (6) by a relative movement of the transport unit (3) and the support element (6);
   the transport unit (3) has at least one container holder (8) which carries the at least one container (2);
   the at least one container holder (8) is decouplable from the transport unit (3); and the at least one support element (6) engages on the at least one container holder (8) for coupling with the container (2).

2. The processing device (1) according to claim 1, wherein the at least one container holder (8) is decoublable from the transport unit (3) by the relative movement.

3. The processing device (1) according to claim 1, wherein the at least one support element (6) for engaging on the at least one container holder (8) is arranged to be at least one of movable or stationary.

4. The processing device (1) according to claim 1. wherein the at least one container holder (8) is adapted in shape to the at least one container (2) on a side (12) thereof facing the at least one container (2).

5. The processing device (1) according to claim 1, wherein the at least one support element (6) grips the at least one container holder (8) on an outside thereof.

6. The processing device (1) according to claim 1, further comprising a processing station (20) with which the processing is adapted to be carried out, the processing station (20) comprises a filling station, a scale, a control station and/or a closing station.

7. The processing device (1) according to claim 1, wherein the at least one support element (6) is arranged on a carrier (21) which provides a parking space (22) for the transport unit (3) during uncoupling of the at least one container (2).

8. The processing device (1) according to claim 1, wherein the container (2) is detachably connected to the at least one container holder (8).

9. The processing device (1) according to claim 1, wherein the at least one support element (6) is fastened on or adjacent to the drive surface (5).

10. The processing device (1) according to claim 1, wherein at least one of a) the at least one container holder (8) is designed to hold more than one container (2) at a same time or b) the at least one container holder (8) is designed to support a matched container (2) with an uneven base (29).

11. The processing device (1) according to claim 1, wherein the at least one container holder (8) is designed in two parts, including a container part (30), which is connectable to the at least one container (2), that is separable from a support part (31), which is couplable to the at least one support element (6).

12. The processing device (1) according to claim 1, wherein the at least one container holder (8) is at least one of a) held in position in a state coupled to the transport unit (3) by at least one of a positive or non-positive connection, or b) is held in position in a state coupled to the support element (6) by at least one of a positive or non-positive connection.

13. The processing device (1) according to claim 1, wherein the at least one container holder (8) has a receiving shape with at least one of a shoulder or a recess, for coupling with the at least one support element.

14. The processing device (1) according to claim 1, wherein the at least one container holder includes more than one container holder (8), and the container holders (8) are couplable at least partially separately from one another and/or together with the at least one support element (6), are at least one of couplable or decouplable from the transport unit (3).

15. A method for processing at least one container (2), the method comprising:
moving the at least one container (2) with a transport unit (3), which is magnetically coupled to a stator assembly (4) and is movable on a drive surface (5) by energizing the stator assembly (4), and is moved to at least one support element (6);
coupling the at least one container (2) to the at least one support element (6) by a relative movement of the transport unit and the support element (6);
wherein at least one container holder (8) of the transport unit (3) carries the at least one container (2), the at least one container holder (8) is decouplable from the transport unit (3), the at least one support element (6) engages on the at least one container holder (8) for coupling and the processing of the at least one container (2) is carried out when the at least one support element (6) engages on the at least one container holder (8).

16. The processing device (1) according to claim 1, wherein the transport unit (3) forms a pass-through grip (9) on a base body (11) carrying the at least one container holder (8), for the at least one support element (6) to the container holder (8).

17. The processing device (1) according to claim 1, wherein the transport unit (3) has a receiving geometry (14) with which the at least one container holder (8) is adapted to be received, and the receiving geometry (14) has a support (15) on which the at least one container holder (8) is placed.

18. The processing device (1) according to claim 6, wherein the support element (6) forms a movable part of the processing station.

19. The processing device (1) according to claim 1, wherein the at least one container holder (8) is detachably connected to an exchangeable base body (11) of the transport unit (3).

20. The processing device (1) according to claim 1, wherein the at least one support element (6) is aligned such that a coupling movement of the coupling with the at least one container (2) for engaging on the at least one container holder (8), takes place at least one of along or transversely to the drive surface (5).

* * * * *